US009373249B2

(12) United States Patent
Huang et al.

(10) Patent No.: US 9,373,249 B2
(45) Date of Patent: *Jun. 21, 2016

(54) WI-FI/RADIO FREQUENCY CONVERTING DEVICE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Yunlin (TW); Yu-Chin Tsai, Kaohsiung (TW)

(73) Assignee: GRAND MATE CO., LTD., Taichung (TW)

( * ) Notice: Subject to any disclaimer, the term of this patent is extended or adjusted under 35 U.S.C. 154(b) by 65 days.

This patent is subject to a terminal disclaimer.

(21) Appl. No.: 14/260,725

(22) Filed: Apr. 24, 2014

(65) Prior Publication Data

US 2015/0071269 A1 Mar. 12, 2015

(30) Foreign Application Priority Data

Sep. 11, 2013 (TW) ............................ 102132823 A

(51) Int. Cl.
*H04J 3/22* (2006.01)
*G08C 17/02* (2006.01)

(52) U.S. Cl.
CPC ........... *G08C 17/02* (2013.01); *G08C 2201/40* (2013.01); *G08C 2201/42* (2013.01)

(58) Field of Classification Search
CPC ........... G08C 17/02; G08C 2201/40–2201/42; G08C 2201/50–2201/51
See application file for complete search history.

(56) References Cited

U.S. PATENT DOCUMENTS

| | | | | |
|---|---|---|---|---|
| 2007/0171091 A1* | 7/2007 | Nisenboim | G08C 17/00 | 340/12.24 |
| 2010/0302025 A1* | 12/2010 | Script | G01P 15/09 | 340/539.1 |
| 2012/0019400 A1* | 1/2012 | Patel | G08C 17/00 | 340/870.15 |
| 2012/0082461 A1* | 4/2012 | Meyer | G08C 17/02 | 398/106 |
| 2012/0303182 A1* | 11/2012 | Choi | H04W 4/046 | 701/2 |
| 2014/0246498 A1* | 9/2014 | Proud | G06K 19/07762 | 235/492 |
| 2014/0247154 A1* | 9/2014 | Proud | H02J 7/025 | 340/870.09 |
| 2015/0070141 A1* | 3/2015 | Huang | G08C 17/02 | 340/12.5 |

* cited by examiner

*Primary Examiner* — Kevin Mew
(74) *Attorney, Agent, or Firm* — Ming Chow; Sinorica, LLC

(57) ABSTRACT

A Wi-Fi/radio frequency (RF) converting device includes a Wi-Fi transceiver, a multiplexing converting module, and a RF transceiver. The Wi-Fi transceiver receives a Wi-Fi control signal from a control signal generator. The multiplexing converting module receives the Wi-Fi control signal from the Wi-Fi transceiver and converts the Wi-Fi control signal into a RF control signal. The RF transceiver receives the RF control signal from the multiplexing converting module and sends the RF control signal to a plurality of electric elements. An RF extension device may be provided to share the signal transmission between the electric elements and the Wi-Fi/RF converting device.

14 Claims, 4 Drawing Sheets

WI-FI/RADIO FREQUENCY CONVERTING DEVICE

The current application claims a foreign priority to the patent application of Taiwan No. 102132823 filed on Sep. 11, 2013.

BACKGROUND OF THE INVENTION

1. Technical Field

The present invention relates generally to a signal converter, and more particular to a Wi-Fi/radio frequency (RF) converting device.

2. Description of Related Art

As the development of technology, there are various electric appliances in ordinary homes, such as gas stove, electrical water heater, fan, and so on. There usually is a control device on an electric appliance for manual control of the electric appliance. However, people have to approach the electric appliance to operate the control device. it is very inconvenient for a person who wants to control an electric appliance which is far away, such as an outdoor water heater.

To improve above drawback, a remote control, which is equipped with radio frequency (RF) module to generate RF signals, is provided for control of a specific electric appliance, so that people may control the electric appliances with the specified remote controls.

The remote control provides an easy way of controlling the electric appliance, however, we have more and more remote controls at home as we get more electric appliances. So, we spend longer time in finding the remote control than the time we walk to the electric appliance and operate the control device on it. Besides, as the development of wireless network, most of ordinary homes have Wi-Fi networks. It will be very convenient if the electric appliances at home could be controlled through the Wi-Fi network.

BRIEF SUMMARY OF THE INVENTION

In view of the above, the primary objective of the present invention is to provide a Wi-Fi/RF converting device, which converts Wi-Fi signals into RF signals to control a plurality of electric elements of an electric appliance at the same time.

The present invention provides a Wi-Fi/radio frequency converting device, including a Wi-Fi transceiver, a multiplexing converting module, and a radio frequency transceiver. The Wi-Fi transceiver receives a Wi-Fi control signal from a control signal generator. The multiplexing converting module receives the Wi-Fi control signal from the Wi-Fi transceiver and converts the Wi-Fi control signal into a radio frequency control signal. The radio frequency transceiver receives the radio frequency control signal from the multiplexing converting module and sends the radio frequency control signal to a plurality of electric elements.

In an embodiment, wireless Wi-Fi/radio frequency converting device further includes a detachable radio frequency extension device. The radio frequency extension device is connected to the multiplexing converting module to send the radio frequency control signal from the multiplexing converting module to the electric elements, wherein at least one of the electric elements receives the radio frequency control signal from the radio frequency extension device, and the rest electric elements receive the radio frequency control signal from the radio frequency transceiver.

With such design, it may convert the Wi-Fi signals into the RF signals to control a plurality of the electric elements at the same time.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
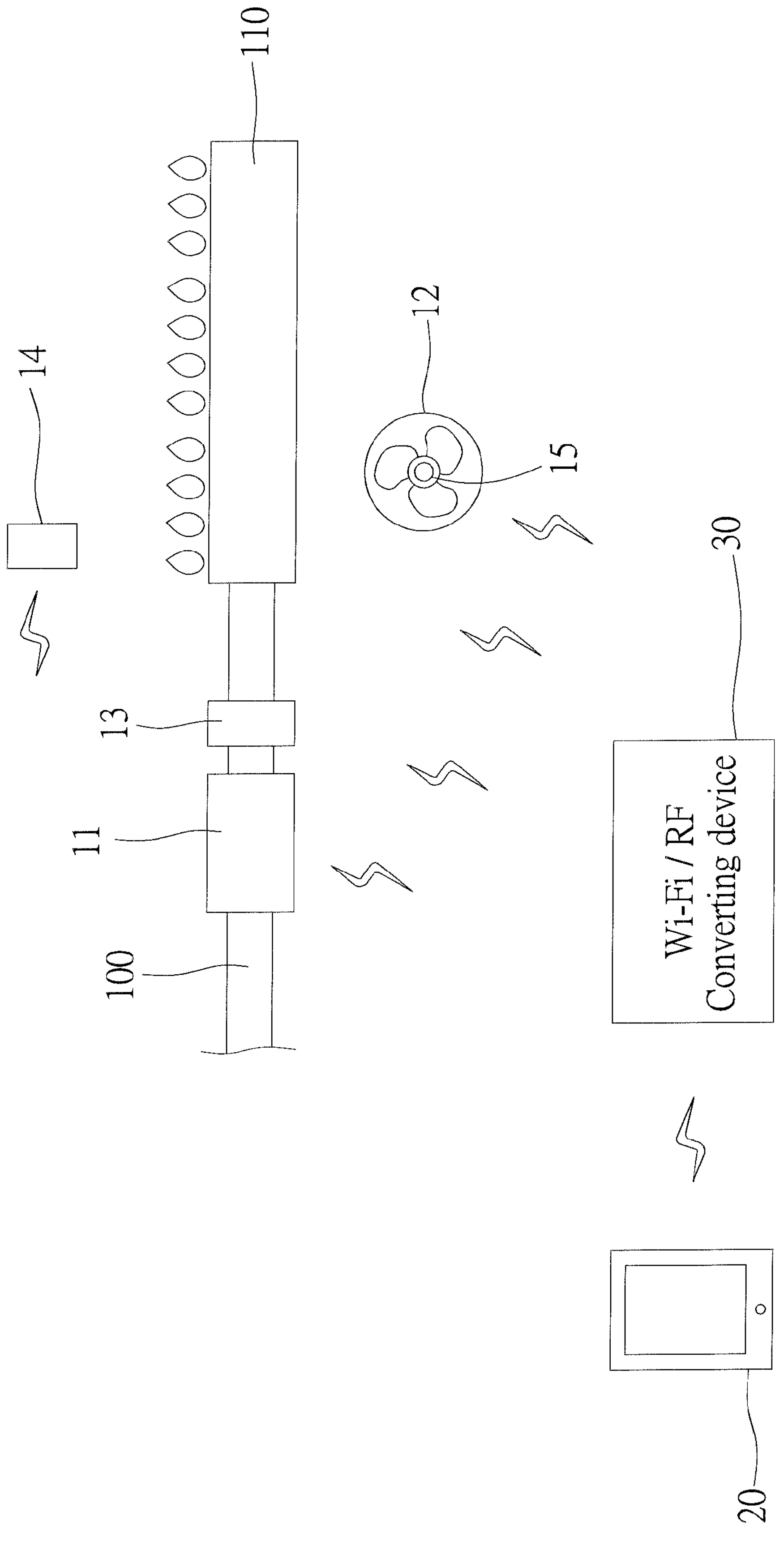
FIG. 1 is a sketch diagram of the wireless control system of a first preferred embodiment of the present invention.

As shown in FIG. 1, a wireless control system of the present invention includes a plurality of electric elements 11-15, a control signal generator 20, and a Wi-Fi/radio frequency (RF) converting device 30.

Figure 2:
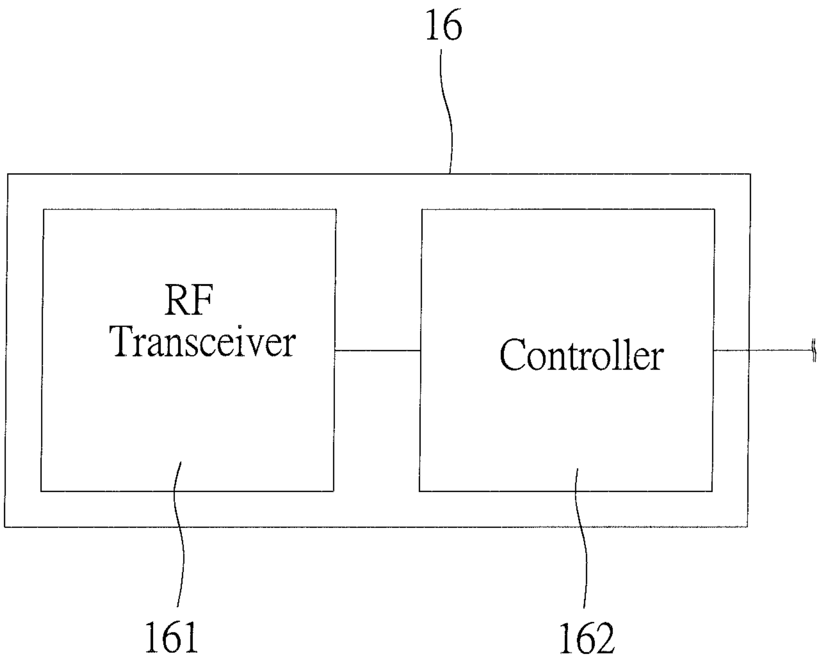
FIG. 2 is block diagram of the controlling device of the first preferred embodiment of the present invention.

In an embodiment of the present invention, the electric elements 11-15 are components of an electric appliance. For example, the electric appliance is a fireplace, and the electric elements include a solenoid valve 11, a blower 12, and three sensors 13-15. The solenoid valve 11 is mounted in a gas pipe 100, which supplies gas with burners 110 of the fireplace. The solenoid valve 11 works according to an electric signal to turn the solenoid valve 11 on/off, or to adjust a gas flow through the solenoid valve 11. In an embodiment, the solenoid valve 11 uses the solenoid valve taught in U.S. patent 2009/0206291A1, which is a ratio solenoid valve to be controlled by a voltage of the electric signal. In practice, any solenoid valve which is controlled by electric signals should be applied in the present invention. The blower 12 supplies airflow to the burners 110. The sensor 13 is provided on the gas pipe 100 between the burners 110 and the solenoid valve 11, the sensor 14 is beside the burners 110, and the sensor 15 is on the blower 12. The sensors 13-15 respectively sense a gas flow in the gas pipe 100, a temperature of the burners 110, and a speed of a motor of the blower 12. As shown in FIG. 2, each electric element 11-15 has a controlling device 16, and each controlling device 16 has a radio frequency (RF) transceiver 161 and a controller 162. The RF transceiver 161 transmits and receives RF signals, and the controller 162 controls the corresponding electric element according to the RF signals received by the RF transceiver 161.

In an embodiment, the control signal generator 20 is a smart phone, which is installed with a specific application for user to input commands to control the electric elements 11-15, such as turn on/off or adjust the electric elements 11-15. The control signal generator 20 may code and package the commands into a Wi-Fi control signal, and the commands will be sent to the electric appliance through the Wi-Fi/RF converting device 30. The control signal generator 20 may be replaced by any electronic device, such as desktop, laptop, tablet, or PDA, which is able to transmit signals through Wi-Fi.

Figure 3:
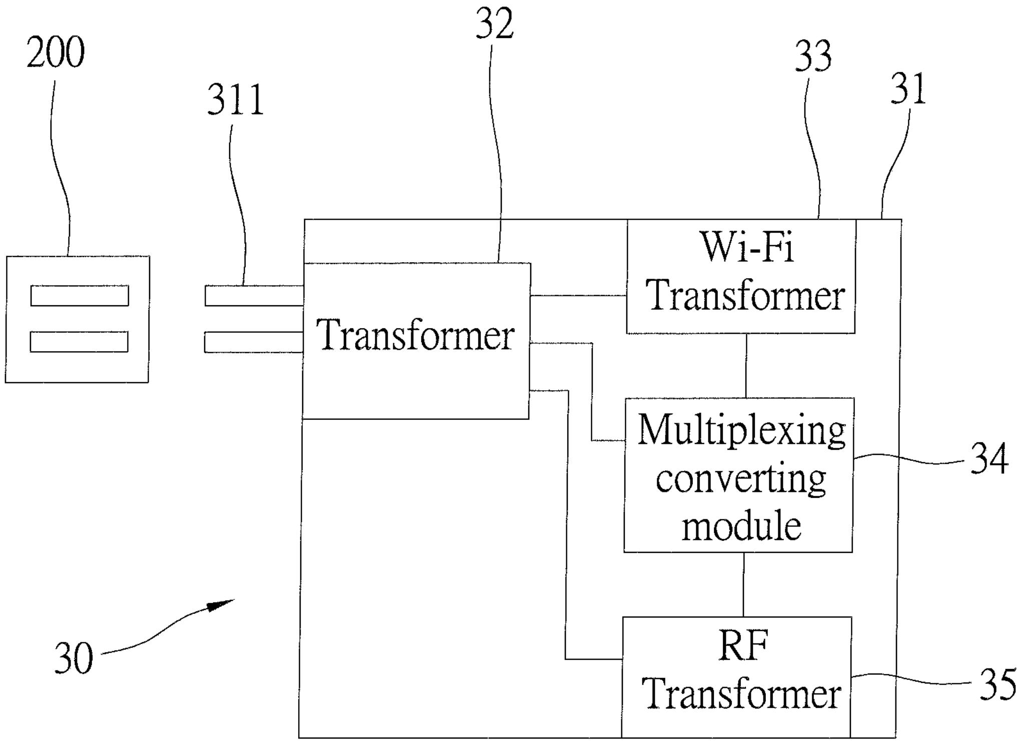
FIG. 3 is a block diagram of the Wi-Fi/RF converting device of the first preferred embodiment of the present invention.

As shown in FIG. 3, the Wi-Fi/RF converting device 30 includes a case 31, in which a transformer 32, a Wi-Fi transceiver 33, a multiplexing converting module 34, and a radio frequency (RF) transceiver 35 are received. The case 31 is an 8×5×5 $cm^3$ rectangular box. A plug 311 is provided on the case 31. The transformer 32 is connected to the plug 311 to convert a voltage (110V) of a power line into a work voltage (12V) for the Wi-Fi transceiver 33, the multiplexing converting module 34, and the RF transceiver 35. The Wi-Fi transceiver 33 receives the Wi-Fi control signals from the control signal generator 20. The multiplexing converting module 34 is connected to the Wi-Fi transceiver 33 to convert the Wi-Fi control signals into RF control signals, and then the RF control signals is sent to RF transceivers 161 of the electric elements 11-15 through the RF transceiver 35 to control the electric elements 11-15 accordingly.

When a user connects the plug 311 to a socket 200 of the power line, the transformer 32 will supply the Wi-Fi transceiver 33, the multiplexing converting module 34, and the RF transceiver 35 with essential power, and the Wi-Fi/RF converting device 30 may work. Then, the user may operate the control signal generator 20 to control the electric elements 11-15 through the Wi-Fi/RF converting device 30.

User may monitor the electric elements 11-15 through the Wi-Fi/RF converting device 30 of the present invention in an opposite way. For example, the sensing results of the sensors 13-15, so called RF data signals, are sent to the RF transceiver 35 of the Wi-Fi/RF converting device 30, by the control of the controllers 162, through the RF transceivers 161 respectively, and then are converted into Wi-Fi data signals by the multiplexing converting module 34. Next, the Wi-Fi data signals are sent to the control signal generator 20 through the Wi-Fi transceiver 33. As a result, the data of the electric elements 11-15 may be shown on the control signal generator 20.

Figure 4:
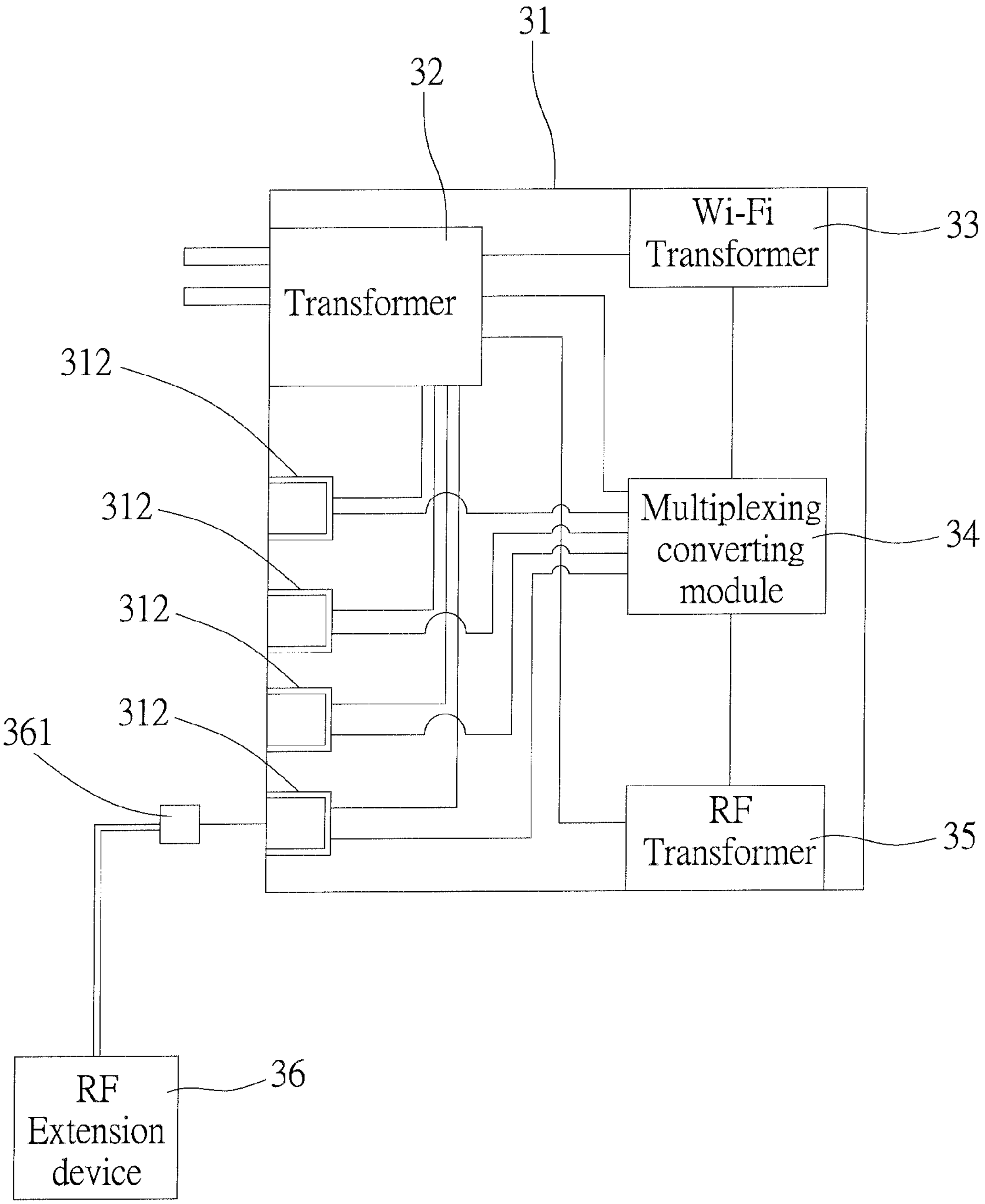
FIG. 4 is a block diagram of the Wi-Fi/RF converting device of the second preferred embodiment of the present invention.

FIG. 4 shows a Wi-Fi/RF converting device of the second preferred embodiment, in which the case 31 is provided with several ports 312. All the ports 312 are connected to the multiplexing converting module 34. A RF extension device 36 has a connector 361 to engage the port 312. The RF extension device 36 has the same function as the RF transceiver 35 to receive and transmit RF signals. The RF extension device 36 is in communication with some of the electric elements, and the RF transceiver 35 is in communication with the rest of the electric elements.

The RF extension device 36 and the RF transceiver 35 share the RF signals transmission between the Wi-Fi/RF converting device and the electric elements to reduce the delay in signal transmission when there are too many electric elements in control. It is easy to understand that four RF extension devices 36 may be connected to the Wi-Fi/RF converting device of the second preferred embodiment for controlling more electric elements. In an embodiment, a frequency of the signal transmission through the RF transceiver 35 is different from that through the RF extension device 36 to avoid interference. For example, the frequency of the RF transceiver 35 is 433 MHz, and the RF extension device 36 is 315 MHz.

Figure 5:
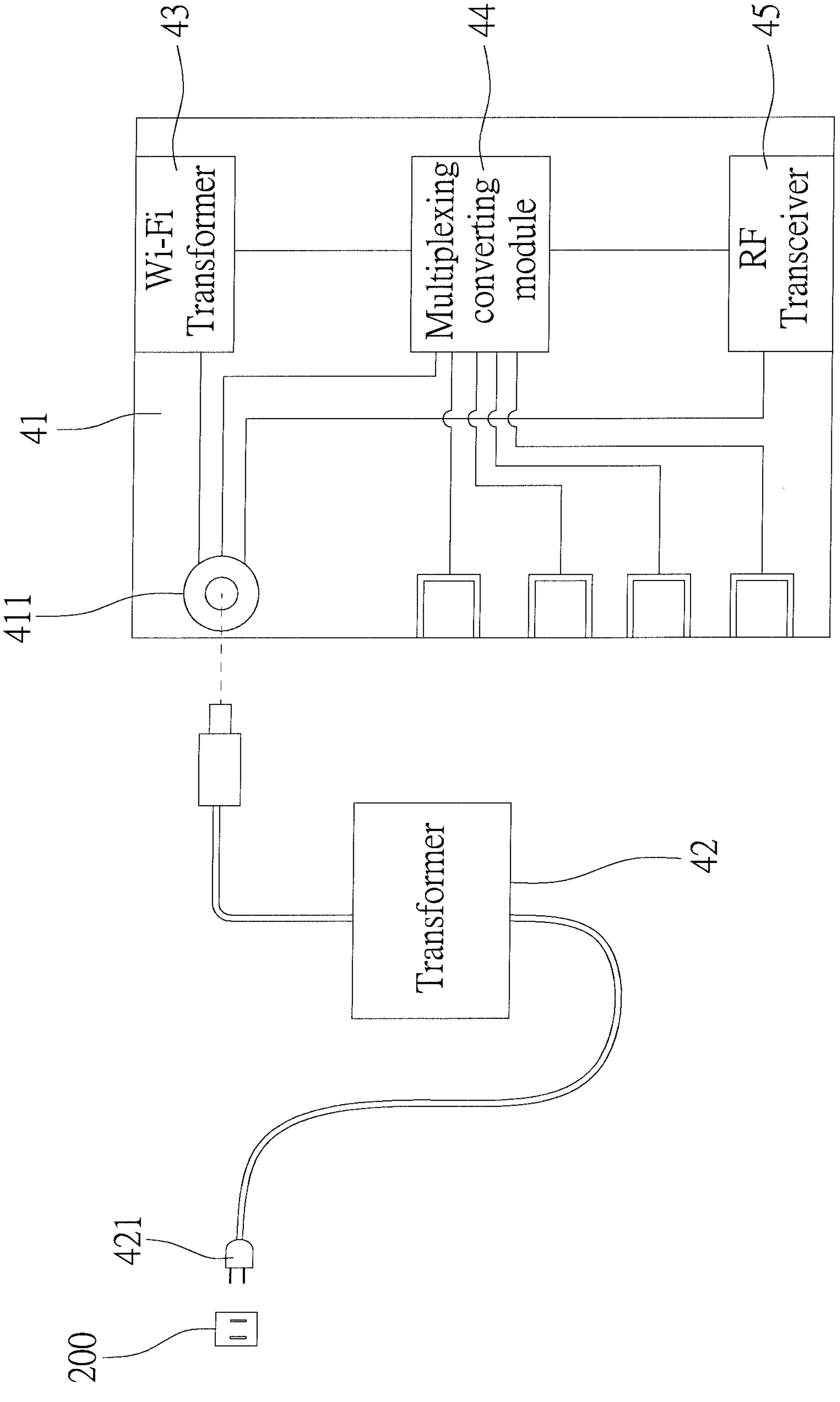
FIG. 5 is a block diagram of the Wi-Fi/RF converting device of the third preferred embodiment of the present invention.

FIG. 5 shows a Wi-Fi/RF converting device 40 of the third preferred embodiment of the present invention, in which a transformer 42 is noted received in a case 41. A plug 421 is provided on the transformer 42 instead of on the case 41 to engage a socket 200 of the power line. The case 41 has a power port 411, and the transformer 42 has a wire and a connector at a distal end of the wire. The connector of the transformer 42 engages the power port 411 to supply a Wi-Fi transceiver 43, a multiplexing converting module 44, and a RF transceiver 45, which are received in the case 41, with power. This design makes the case 41 to be put on a suitable place where is away from the socket 200.

It must be pointed out that the embodiments described above are only some preferred embodiments of the present invention. All equivalent structures which employ the concepts disclosed in this specification and the appended claims should fall within the scope of the present invention.

What is claimed is:

1. A Wi-Fi/radio frequency converting device, comprising:

a Wi-Fi transceiver which receives a Wi-Fi control signal from a control signal generator;

a multiplexing converting module which receives the Wi-Fi control signal from the Wi-Fi transceiver and converts the Wi-Fi control signal into a radio frequency control signal;

a radio frequency transceiver which receives the radio frequency control signal from the multiplexing converting module and sends the radio frequency control signal to a plurality of electric elements; and a radio frequency extension device detachably connected to the multiplexing converting module to receive the radio frequency control signal from the multiplexing converting module, wherein at least one of the electric elements receives the radio frequency control signal from the radio frequency extension device, and the rest electric elements receive the radio frequency control signal from the radio frequency transceiver.

2. The Wi-Fi/radio frequency converting device of claim 1, further comprising a transformer connected to the Wi-Fi transceiver, the multiplexing converting module, and the radio frequency transceiver, wherein the transformer receives an electricity from a power line, and converts a voltage of the electricity into a work voltage for the Wi-Fi transceiver, the multiplexing converting module, and the radio frequency transceiver.

3. The Wi-Fi/radio frequency converting device of claim 2, further comprising a case, in which the transformer, the Wi-Fi transceiver, the multiplexing converting module, and the radio frequency transceiver are received, wherein a plug is provided on the case and connected to the transformer to engage a socket of the power line.

4. The Wi-Fi/radio frequency converting device of claim 2, further comprising a case, wherein the Wi-Fi transceiver, the multiplexing converting module, and the radio frequency transceiver are received in the case, and the transformer is out of the case; the transformer has a plug to engage a socket of the power line.

5. The Wi-Fi/radio frequency converting device of claim 1, wherein the radio frequency transceiver further receives a radio frequency data signal from at least one the electric elements and sends the radio frequency data signal to the multiplexing converting module; the multiplexing converting module converts the radio frequency data signal into a Wi-Fi data signal accordingly; and the Wi-Fi transceiver sends the Wi-Fi data signal to the control signal generator.

6. The Wi-Fi/radio frequency converting device of claim 1, wherein the radio frequency extension device further receives a radio frequency data signal from the at least one of the electric elements and sends the radio frequency data signal to the multiplexing converting module; the multiplexing converting module converts the radio frequency data signal into a Wi-Fi data signal accordingly; and the Wi-Fi transceiver sends the Wi-Fi data signal to the control signal generator.

7. The Wi-Fi/radio frequency converting device of claim 1, wherein the frequency extension device and the radio frequency transceiver transmit the radio frequency control signal in different frequencies.

8. A Wi-Fi/radio frequency converting device, comprising:

a Wi-Fi transceiver which receives a Wi-Fi control signal from a control signal generator;

a multiplexing converting module which receives the Wi-Fi control signal from the Wi-Fi transceiver, and converts the Wi-Fi control signal into a radio frequency control signal; and a radio frequency transceiver which receives the radio frequency control signal from the multiplexing converting module and sends the radio frequency control signal to a plurality of electric elements; and a radio frequency extension device which receives the radio frequency control signal from the multiplexing converting module and sends the radio frequency control signal to the electric elements;

wherein at least one of the electric elements receives the radio frequency control signal from the radio frequency extension device, and the rest electric elements receive the radio frequency control signal from the radio frequency transceiver.

9. The Wi-Fi/radio frequency converting device of claim 8, further comprising a transformer connected to the Wi-Fi transceiver, the multiplexing converting module, the radio frequency transceiver, and the radio frequency extension device, wherein the transformer receives an electricity from a power line, and converts a voltage of the electricity into a work voltage for the Wi-Fi transceiver, the multiplexing converting module, the radio frequency transceiver, and the radio frequency extension device.

10. The Wi-Fi/radio frequency converting device of claim 9, further comprising a case, in which the transformer, the Wi-Fi transceiver, the multiplexing converting module, and the radio frequency transceiver are received, wherein the case is provided with a plug connected to the transformer and a port connected to the multiplexing converting module; the plug engages a socket of the power line, and the radio frequency extension device has a connector to engage the port.

11. The Wi-Fi/radio frequency converting device of claim 9, further comprising a case, wherein the Wi-Fi transceiver, the multiplexing converting module, and the radio frequency transceiver are received in the case, and the transformer and the radio frequency extension device are out of the case; the transformer has a plug to engage a socket of the power line.

12. The Wi-Fi/radio frequency converting device of claim 8, wherein the radio frequency transceiver further receives a radio frequency data signal from at least one of the electric elements and sends the radio frequency data signal to the multiplexing converting module; the multiplexing converting module converts the radio frequency data signal into a Wi-Fi data signal accordingly; and the Wi-Fi transceiver sends the Wi-Fi data signal to the control signal generator.

13. The Wi-Fi/radio frequency converting device of claim 8, wherein the radio frequency extension device further receives a radio frequency data signal from the at least one of the electric elements and sends the radio frequency data signal to the multiplexing converting module; the multiplexing converting module converts the radio frequency data signal into a Wi-Fi data signal accordingly; and the Wi-Fi transceiver sends the Wi-Fi data signal to the control signal generator.

14. The Wi-Fi/radio frequency converting device of claim 8, wherein the frequency extension device and the radio frequency transceiver transmit the radio frequency control signal in different frequencies.

* * * * *